(12) United States Patent
Eromäki

(10) Patent No.: US 7,667,905 B2
(45) Date of Patent: Feb. 23, 2010

(54) ULTRA COMPACT ZOOM CAMERA CONCEPT

(75) Inventor: Marko Eromäki, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/509,301

(22) Filed: Aug. 23, 2006

(65) Prior Publication Data

US 2008/0106811 A1    May 8, 2008

(51) Int. Cl.
*G02B 7/02* (2006.01)
(52) U.S. Cl. .................. 359/817; 359/694; 359/813; 359/815; 359/819; 359/822; 359/823
(58) Field of Classification Search .................. 353/66; 359/642, 676, 694–698, 813, 815, 817, 819, 359/822, 823; 396/72–83
See application file for complete search history.

(56) References Cited

U.S. PATENT DOCUMENTS

| | | | | |
|---|---|---|---|---|
| 4,887,107 A | * | 12/1989 | Nakamura et al. | ............ 396/75 |
| 4,921,343 A | * | 5/1990 | Ushiro et al. | .................. 353/66 |
| 2002/0077161 A1 | * | 6/2002 | Eromaki | ...................... 455/575 |
| 2004/0051972 A1 | * | 3/2004 | Nomura | ...................... 359/701 |
| 2005/0276588 A1 | * | 12/2005 | Tsutsumi | ...................... 396/55 |
| 2006/0034451 A1 | * | 2/2006 | Ijas et al. | ............... 379/433.13 |
| 2006/0109565 A1 | * | 5/2006 | Watanabe et al. | ........... 359/694 |
| 2006/0238882 A1 | * | 10/2006 | Hayashi et al. | ............. 359/649 |
| 2006/0274168 A1 | * | 12/2006 | Watanabe et al. | ........ 348/240.3 |

* cited by examiner

*Primary Examiner*—Jessica T Stultz
*Assistant Examiner*—Mahidere S Sahle
(74) *Attorney, Agent, or Firm*—Ware, Fressola, Van Der Sluys & Adolphson LLP

(57) ABSTRACT

A device is shown having at least two movable lens units, wherein each of the at least two movable lens units has at least one lens, wherein the at least two movable lens units are movable into a first state wherein the at least two movable lens units are arranged in parallel to each other, and wherein the at least two movable lens units are movable into a second state wherein the at least two movable lens units are arranged on top of each other for positioning the lenses of the at least two movable lens units in an optical axis.

19 Claims, 13 Drawing Sheets

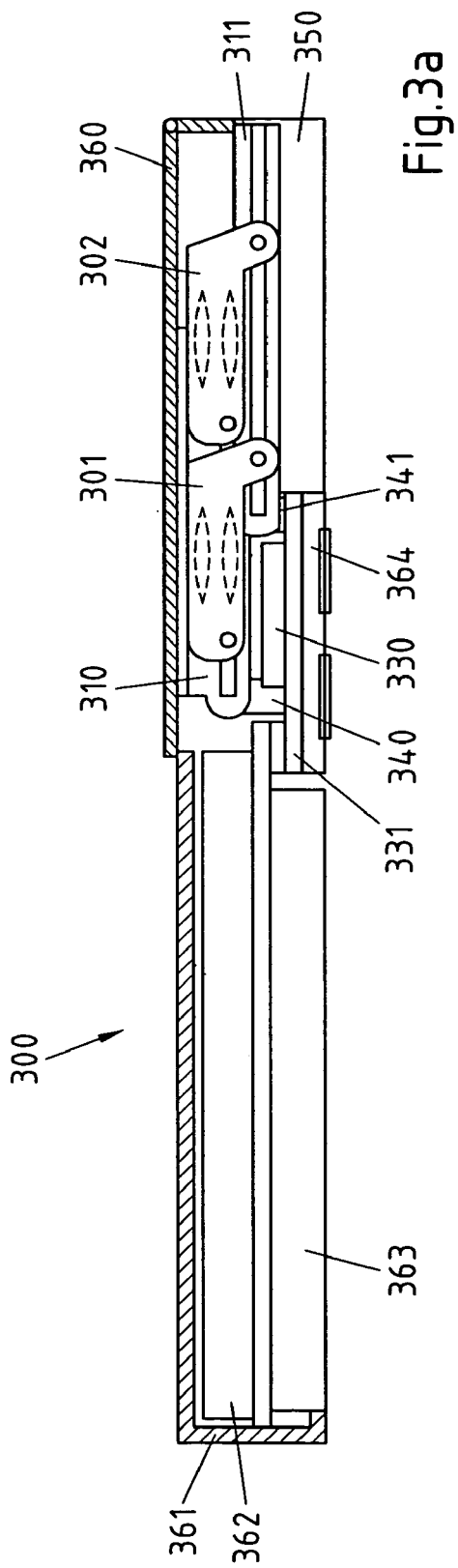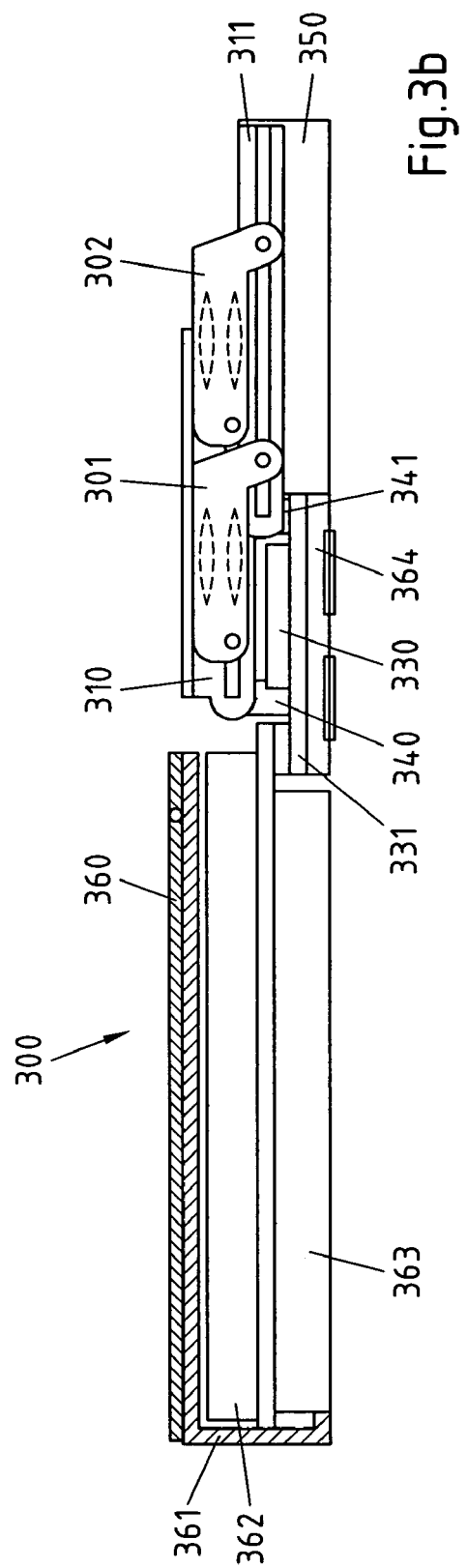

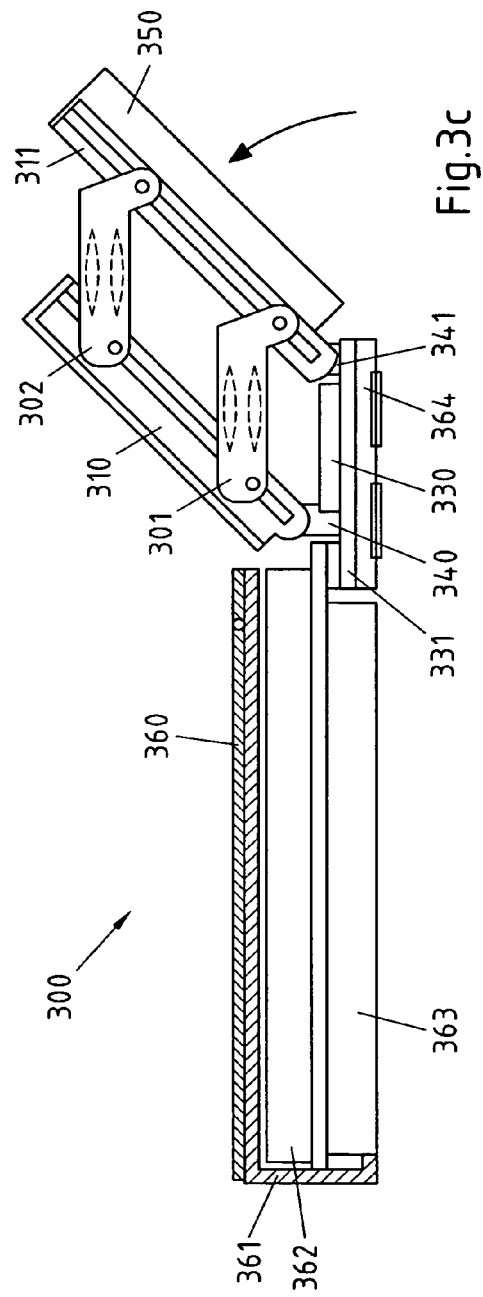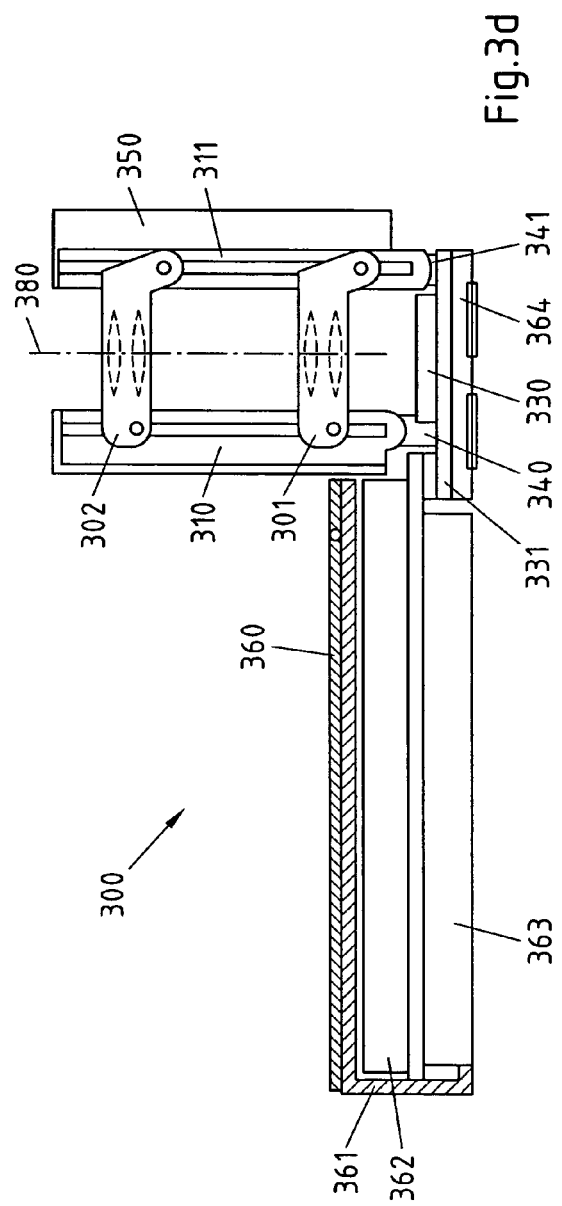

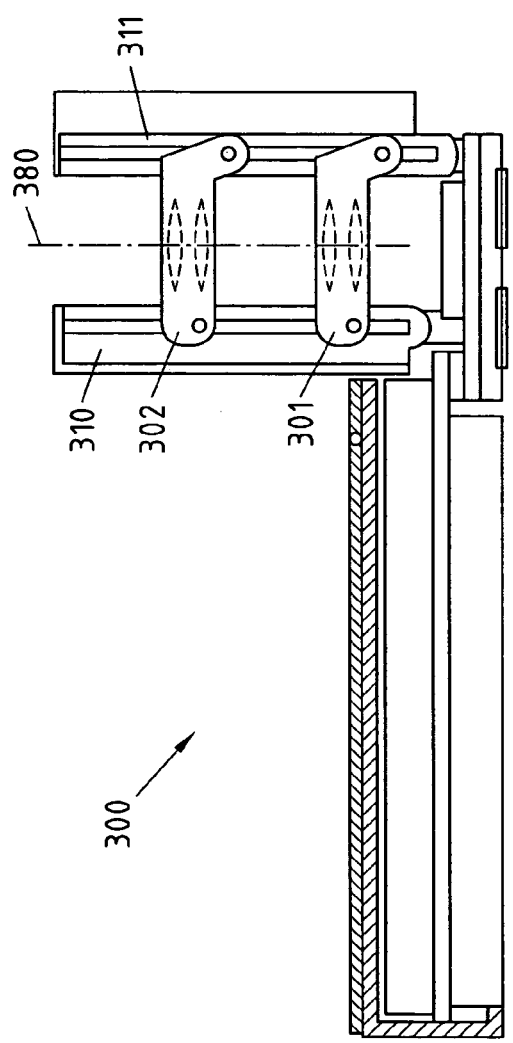
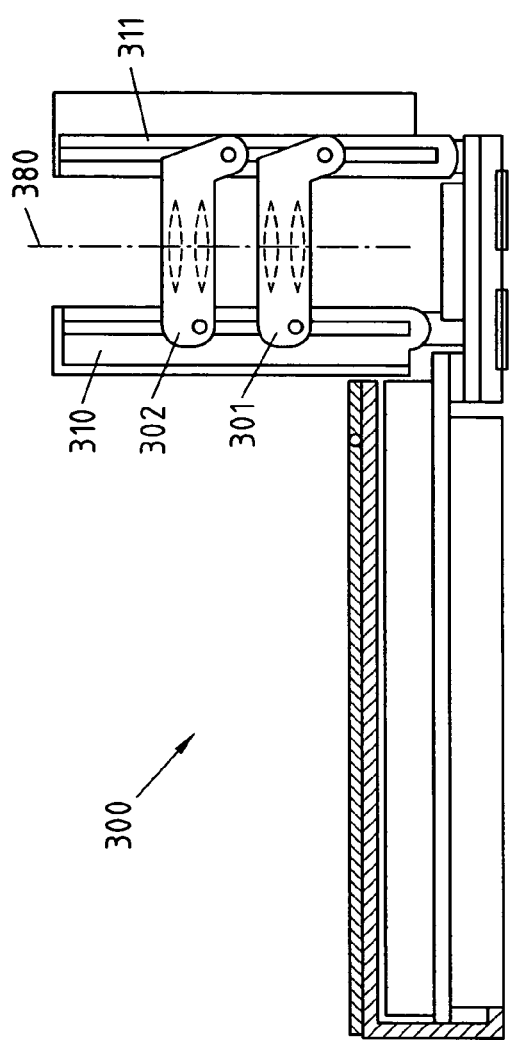

ULTRA COMPACT ZOOM CAMERA CONCEPT

FIELD OF THE INVENTION

This invention relates to a device comprising at least two movable lens units, wherein each of said at least two movable lens units comprises at least one lens.

BACKGROUND OF THE INVENTION

Good image quality and minituarization of imaging devices, especially optics, are difficult to combine. Zoom and autofocus functions need space to extend/retract, typically from few millimeters to few tens of millimeters, and the amount and size of high quality lenses need to be fitted inside the structure.

Trendwise the miniaturization of digital still cameras have undergone a transition into very thin, pocket size, devices. From an optics point of view the typical extending & retracting zoom/autofocus features have been formed into smaller shape, folded optics. In these the movement of lenses takes place totally inside the device and a prism is used to fold the viewing angle 90 degrees.

This solution has the drawback that only relatively small lenses can be used for the folded optics since they are placed totally inside the device, but this leads to decreased optical quality of the optical system. Furthermore, the small lenses implicates the use of a relatively small image sensor which also decreases the picture quality.

Unfortunately, the use of bigger lenses in such a folded optic system would lead to a tremendous increase of the device's size.

SUMMARY OF THE INVENTION

In view of the above-mentioned problem, it is, inter alia, an object of the present invention to provide a device for enabling high performance camera optics within a very thin structure.

A device is proposed comprising at least two movable lens units, wherein each of said at least two movable lens units comprises at least one lens, wherein said at least two movable lens units are movable into a first state wherein said at least two movable lens units are arranged in parallel to each other, and wherein said at least two movable lens units are movable into a second state wherein said at least two movable lens units are arranged on top of each other for positioning the lenses of said of at least two movable lens units in an optical axis.

For example, the device may represent an analog or digital still camera, or an analog or digital video camera, or any other optical device that comprises at least two lens units.

For instance, a first lens unit of said at least two movable lens units may represent a lens unit for effecting a focus function, and a second lens unit of said at least two movable lens units may represent a lens unit for effecting a zoom function. Furthermore, said at least two movable lens units may comprise at least one further lens unit, e.g. a further lens unit having a negative refracting power and/or a further lens unit having a positive refracting power. Further, one of said at least two movable lens units may comprise an aperture stop.

In the first state said at least two movable lens units are arranged in parallel to each other, and thus the maximum height of this arrangement is defined by the height of the highest of said at least two movable lens units. Thus, larger optics can be used for said at least two movable lens units without increasing the height of said arrangement considerably, since the maximum height of said arrangement does not depend on the sum of the height any of said at least two movable lens units but only on the height of the highest of said at least two movable lens units. The use of larger optics may lead to increased image quality. These larger optics may be larger lenses. In this first state, no images can be taken by means of said at least two movable lens units, since the optical axis of the lenses of said at least two movable lens units are not aligned.

In the second state said at least two movable lens units are arranged on top of each other for positioning the lenses of said at least two movable lens units in an optical axis. In case the device represents a digital device an image sensor may be placed in the device so that the optical sensor is aligned with the optical axis of the lenses of said at least two movable lens units. The image sensor may be represented by a CCD sensor, e.g. a single CCD-sensor or a 3CCD, or by a CMOS image sensor or by an NMOS linear image sensor or any other kind of suitable image sensor. In case of an analog device an analog film may be placed aligned with the optical axis of the lenses of said at least two movable lens units. The image sensor or the analog film may be placed in such a way that in the second state the image sensor or the analog film is adjacent to the parallel arranged at least two movable lens units. Thus, a compact size of the arrangement of said at least two movable lens units and the image sensor/analog film may be achieved.

Thus, the second state may correspond to an active state for taking pictures, and the first state may correspond to a mobile or packet state of the device.

The device may comprise mechanical or electromechanical means for moving said at least two movable lens units into the first state or into the second state, e.g. a lever mechanism may be used to perform said moving. Any of said at least two movable lens units may be connected to said lever mechanism, e.g. by means of joints, so that the lever mechanism may be capable to unfold said at least two movable lens units from the first into the second state and to fold said at least two movable lens units from the second state into the first state.

The device may comprise a housing comprising a slide cover, wherein said at least two movable lens units are located inside the housing and covered with the slide cover in the first state, wherein the slide cover is in a first position. In the second state the slide cover may be moved away into a second position so that the lens units can be unfolded and arranged on top of each other. For example, the slide cover may be coupled to the lever mechanism so that when the slide cover is moved from the first position into the second position said lens units are unfolded from the first state into the second state, and, when the slide cover is moved from the second position into the first position said lens units are folded from the second state into the first state. This coupling may be mechanically or electrically. In case of an electrical coupling, it may be detected by a sensor that the slide cover is moved into the second position and then the lever mechanism is activated to move the lens units from the first state into the second position, and, vice versa, the sensor may detect that the slide cover is moved from the second position to the first position and then the lever mechanism is activated to move the lens units from the second state into the first state. Furthermore, both the slide cover and the lever mechanism may be controlled and moved electrically, so that a user may indicate to the camera by means of an interface, e.g. a button, to activate the camera, and then the closed slide cover is moved electrically from the first position into the second position and the lever mechanism moves the lens units from the first state into the second state, and, vice versa, when the user indicates to deactivate the camera.

Furthermore, at least one of said at least two movable lens units may be capable to be moved along the optical axis in the second state e.g. to provide a zoom function and/or a focus function. For example, the first lens unit for effecting a focus function may be suited to be moved along the optical axis and the second lens unit for effecting a zoom function may be suited to be moved along the optical axis. To enable this movement the device may comprise at least one actuator or driver to move said at least one of said at least two movable lens units along the optical axis, wherein said actuator or driver may be a stepper motor or a piezo based actuator.

Thus, according to the present invention, the arrangement of said at least two movable lens units in the first state requires only little height so that it can be placed in a small camera thereby achieving a thickness reduction of the small camera. Furthermore, since the maximum height of said arrangement of lens units in the first state does not depend on the sum of the height of said at least two movable lens units but only on the height of the highest of said at least two movable lens units, larger optics may be used for the at least two lens units without increasing the arrangement's height considerably which may lead to higher optic performance. For instance, wide lenses may be used for the lenses of said at least two movable lens units enabling a stable modulation transfer function (MTF) over the whole area. The use of wide lenses further allows use of a larger image sensor and/or larger pixels or more resolution and resulting in high image quality, and it allows low f-number or focus ratio of the device which enables more sensivity.

A device according to the present invention may for example be placed inside or integrated to a mobile phone, PDA or any other electronic handheld device.

According to an embodiment of the present invention, one lens unit of said at least two movable lens units represents a lens unit for effecting a focus function.

This lens unit for effecting a focus function may be capable of moving along the optical axis in order to provide the focus function, wherein this focus function may be controlled by a user via an interface, or it may be controlled by an autofocus.

According to an embodiment of the present invention, the focus function is an autofocus function.

According to an embodiment of the present invention, one lens unit of said at least two movable lens units represents a lens unit for effecting a zoom function.

This lens unit for effecting a zoom function may be capable of moving along the optical axis in order to provide the zoom function, i.e. to zoom in or out, wherein this zoom functions may be controlled by a user via an interface.

According to an embodiment of the present invention, a first lens unit of said at least two movable lens units represents a lens unit for effecting a focus function, and wherein a second lens unit of said at least two movable lens units represents a lens unit for effecting a zoom function.

Thus, the first lens unit corresponds to the lens unit for effecting a focus function mentioned above, and the second lens unit corresponds to the lens unit for effecting a zoom function mentioned, and hence the explanations about these lens units also hold for the first and second lens unit. For instance, the first lens unit may be a lens unit for effecting an autofocus function.

According to an embodiment of the present invention, one of said at least two movable lens units comprises an aperture stop.

For example, the aperture stop may be placed in front of the at least one lens of said one of said at least two movable lens units at the light incidence side, or, if said one of said at least two movable lens units comprises at least two lenses the aperture stop may also be placed between two lenses of said at least two lenses.

According to an embodiment of the present invention, in the second state at least one of said at least two movable lens units is movable along the optical axis.

Said at least one of said at least two movable lens units may be connected to an actuator for moving said at least one of said at least two movable lens units along the optical axis. For instance, said at least one of said at least two movable lens units may represent a lens unit for effecting focus function and/or a lens unit for effecting zoom function. The moving of each of said at least one of said at least two movable lens unit may be controlled separately, e.g. by a single actuator or by separate actuators.

According to an embodiment of the present invention, said device comprises a lever mechanism to move said at least two movable lens units into the first or into the second state, wherein said lever mechanism is connectable to a base member.

For instance, the lever mechanism may be fixed to the base member, or the lever mechanism may be connected to the base member by at least one hinge. The base member may represent a part of a camera housing or any suitable kind of rack inside of a camera. Furthermore, an image sensor may be placed on the rack.

For example, the lever mechanism may be hinged from one end at the base member, and each of said at least two movable lens units may be connected to an actuator, said actuator being fixed to the lever mechanism and capable of rotating the corresponding lens unit, via joints to said lever mechanism, so that said lever mechanism is capable of unfolding said at least two movable lens units from the first state into the second state and to fold said at least two movable lens units from the second state into the first state. Further, said actuator may further be capable to move at least one of said at least two movable lens units along the optical axis when said at least two movable lens units are arranged in the second state.

Furthermore, this lever mechanism enables keeping said at least two movable lens units fixed with respect to the optical axis in the second state even during a linear movement of at least on of said at least two movable lens units along the optical axis. Thus, the lever mechanism minimizes x-y errors between the movable lens units which is important for good image quality.

Further, the lever mechanism may keep the optical axis of a first of said at least two movable lens units in parallel to the optical axis of the remaining of said at least two movable lens units during the folding and unfolding process.

According to an embodiment of the present invention, the lever mechanism comprises at least two guide shafts, wherein each of said at least two guide shafts is hinged to the base member, and wherein each of said at least two movable lens units is connected to said at least two guide shafts via a set of joints, wherein each of the joints of said set of joints has a degree of freedom for enabling rotational movement, and wherein at least one of the joints of said set of joints has a second degree of freedom for enabling linear movement, so that said lever mechanism is capable of unfolding said at least two movable lens units from the first state into the second state and of folding said at least two movable lens units from the second state into the first state.

For example, the guide shafts are hinged at corner areas to the base member so that they can fold approximately ninety degrees. Thus, the guide shafts may have an angle of ninety degrees to the base member when said at least two movable lens units are in the second state. Furthermore, the device may comprise an image sensor which is aligned to the optical axis of the lenses of said at least two movable lens units in the second state. Thus, said guide shafts may be arranged to be capable of being folded from a first position, wherein said at least two movable lens units are arranged in parallel to each other according to the first state, into a second position corresponding to the second state of said at least two movable lens units so that the image sensor may take pictures by means of said at least two movable lens units in the second state.

The connection of said at least two movable lens units to the at least two guide shafts via joints may enable automatic lifting up of said at least two movable lens units from the first state into the second state when the guide shafts are folded from the first position into the second position. Each of said at least two guide shafts may be provided with a rail or a groove for enabling said linear movement of said joints having the second degree of freedom.

When the guide shafts are rotated from the first to the second position, said at least two moveable lens units are automatically moved from the first state into the second state by means of said set of joints.

For instance, the lever mechanism may comprise four guide shafts, and each of said set of joints comprises four joints for connecting one of said at least two movable lens units to the four guide shafts. At least two of said four joints have two degrees of freedom for enabling rotational and linear movement.

According to an embodiment of the present invention, each joint of at least one of said set of joints has two degrees of freedom for enabling rotational and linear movement, and in the second state the at least one of said at least two movable lens units associated with said at least one of said set of joints units is movable along the optical axis.

Since said at least one of said at least two movable lens units is connected via joints enabling both linear and rotational movement to said guide shafts, said at least one of said at least two movable lenses can be shifted up or down guided by the guide shafts. For instance, this up or down shifting may be used in the second state in order to move said at least one of said at least two moveable lens units along the optical axis and to perform a zoom function and/or a focus function.

According to an embodiment of the present invention, the device comprises at least one actuator for moving said at least one of said at least two movable lens units along the optical axis when said at least two movable lens units are arranged in the second state.

Said at least one actuator may be placed at one of said at least two guiding shafts, or said at least one actuator may be placed between two adjacent guide shafts of said at least two guide shafts. An actuator of said at least one actuator may be a stepper motor or a piezo based actuator.

The moving of said at least one of said at least two movable lens units may be performed by a single actuator, which may be capable of shifting each of said at least one of said at least two movable lens units separately, or by a plurality of actuators, wherein for example each of said at least one of said at least two movable lens units is provided with an own actuator.

Each of said at least one of said at least two movable lens units is connected to the guide shafts via joints enabling both linear and rotational movement as mentioned above, so that said at least one actuator is capable to shift said at least one of said at least two movable lens units guided by the guide shafts.

According to an embodiment of the present invention, said at least one actuator is fixed to the lever mechanism, and each of said at least one of said at least two movable lens units is connected to one of said at least one actuator via an actuator interface.

For instance, said actuator interface may be connected to at least one joint of the set of joints of the corresponding lens unit of said at least one of said at least two movable lens units, so that said actuator interface is not rigidly mounted to the corresponding lens unit but enables a rotatable connection to the corresponding lens unit well suited to allow the folding and unfolding process of the guide shafts and to shift the corresponding lens unit along the optical axis in the second state by means of shifting said at least one joint of the set of joints of the corresponding lens units.

Furthermore, said actuator may be connected with at least one separate pin to the corresponding lens unit, wherein this at least one pin is inserted in a corresponding hole of the corresponding lens unit, so that that said actuator interface is not rigidly mounted to the corresponding lens unit but enables a rotatable connection to the corresponding lens unit well suited to allow the folding and unfolding process of the guide shafts and to shift the corresponding lens unit along the optical axis in the second state.

According to an embodiment of the present invention, said at least one actuator is suited to align said at least one of said at least two movable lens units so that the lenses of said at least one of said at least two movable lens units are arranged in the optical axis in the second state.

Thus, a misalignment of said at least one of said at least two movable lens units is avoided even during the movement of any of said at least one of said at least two movable lens units in the guiding shafts by means of said at least one actuator.

According to an embodiment of the present invention, a spring connects the actuator interface and the corresponding lens unit to keep the corresponding lens unit at a ninety degree angle to the guide shafts during the second state.

For example, this spring is mounted with a first side to the actuator interface and with a second side to the corresponding lens unit. Said spring may be represented by a small coil.

For instance, said spring is arranged in such a way that it applies no force to the corresponding lens unit when the position of this lens unit is at a ninety degree angle to the guide shafts, but in case of a misalignment of this lens unit with respect to the guide shafts, i.e. an angle deviating from ninety degrees to the guide shafts, this spring automatically applies a force in an direction opposite to this misalignment. Thus, this spring may allow control of the alignment of the optical axis of the corresponding lens unit with respect to an image sensor placed on the base member during the second state. Furthermore, this alignment control also enables keeping the corresponding lens unit in a planar state during a movement sequence of said lens unit.

According to an embodiment of the present invention, a first small magnet is arranged on a sidewall of a first of said at least one of said at least two movable lens units, and a second small magnet is mounted movably on one of said at least two guide shafts, so that in the second state said first small magnet fixes magnetically to the second small magnet and is capable to keep the corresponding lens unit at a ninety degree angle to the guide shafts during the second state.

For instance, the second small magnet may be fixed at one side of a carrier, wherein said carrier comprises a joint on the other side of the carrier for mounting the carrier and the second small magnet movably on said one of said at least two guide shafts.

Thus, at the end of the unfolding process when said at least two movable lens units reach the second state said at least one of said at least two movable lens units is fixed magnetically to the corresponding second magnet.

Since the corresponding second magnet enables linear movement with respect to the guide shaft, the second magnet can follow a movement of the corresponding lens unit of said at least one of said at least two movable lens units along the optical axis in the second state, thereby keeping the corresponding lens unit aligned with the optical axis, thereby preventing twisting and/or wobbling.

When said at least two movable lens units are folded from the second state into the first state, the magnetic fixing between a first and a second magnet is disconnected.

The use of said first and said second magnet to keep the corresponding lens unit straight during their vertical movements in the second state shows the further advantage that magnets are reliable and thus not tolerance-sensitive, and that magnets are permanent and do not wear.

According to an embodiment of the present invention, said at least one actuator is capable of moving said at least one of said at least two movable lens units to a suitable place before the guiding shafts start to fold down said at least two movable lens units into the first state.

This suitable place in the second state allows folding said at least one of said at least two movable lens units in parallel position next to corresponding adjacent lens units in the first state. This results in a minimal thickness of the arrangement comprising said at least two movable lens units.

According to an embodiment of the present invention, at least one side surface between two adjacent guide shafts is covered with at least two overlapping wings, wherein said at least two overlapping wings form a foldable sidewall capable of following a shape deformation of said side surface between said two adjacent guide shafts.

Said at least two overlapping wings may be connected in a rotatable manner with respect to each of said two adjacent guide shafts, or to a first and a second cover fixed to a first and a second of said two adjacent guide shafts, respectively, so that the foldable sidewall of said at least two overlapping wings changes its shape during the folding and/or unfolding process, thereby approximately following the shape deformation of said side surface between said two adjacent guide shafts.

For example, each side surface between two adjacent guide shafts of said at least two guide shafts which is shape deformed during the folding/unfolding process may be covered with said foldable sidewall comprising said at least two overlapping wings.

This foldable sidewall shows the advantage in the first state and in the second state and during the folding and unfolding process dust protection is ensured by means of the foldable sidewall.

According to an embodiment of the present invention, the base member comprises an optical sensor, and said optical sensor is aligned with the optical axis of the lenses of said of at least two movable lens units in the second state.

For instance, this invention allows introducing high optics performance to mid-range digital still cameras which are typically small, pocket size and portable. When applied to cameras inside mobile phones, the resulted thickness reduction is even more appreciated and needed.

For instance, this invention allows to use wide lenses for the lenses of said at least two movable lens units enabling a stable modulation transfer function (MTF) over the whole area. The use of wide lenses further allows using a larger image sensor and/or larger pixels or more resolution and results in high image quality, and it allows low f-number or focus ratio of the device which enables more sensitivity.

The mechanical linkage of said at least two movable lens units to the lever mechanism, which may comprise at least two guide shafts, allows fixing the optical axis of said at least two movable lens unit in the second state even during a linear movement of at least one of said at least two movable lens units along the optical axis.

A device according to the present invention may for example be placed inside or integrated to a mobile phone, PDA or any other electronic handheld device.

According further to the invention apparatus is provided comprising at least a first movable lens unit means and a second movable lens unit means for moving into a first state arranged in parallel and for moving into a second state arranged on top of each other for positioning lenses of said at least the first movable lens unit means and the second movable lens unit means in an optical axis.

These and other aspects of the invention will be apparent from and elucidated with reference to the embodiments described hereinafter.

BRIEF DESCRIPTION OF THE FIGURES

In the figures show:

FIGS. 3a-3f: a second exemplary embodiment of the present invention; and

DETAILED DESCRIPTION OF THE INVENTION

Figure 1A:
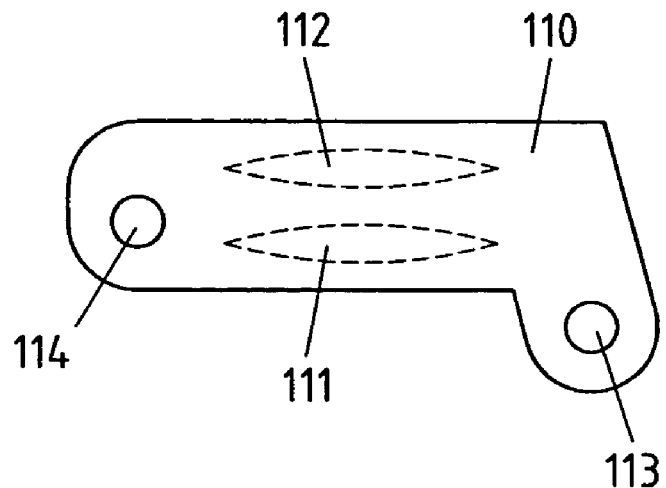
FIGS. 1a-1b: exemplary embodiments of lens units suited to be used for the present invention.

FIG. 1a depicts the side-view of an exemplary lens unit 110 or lens unit means suited to be applied to the present invention. As depicted in FIG. 1a, said exemplary lens unit 110 may comprise a first lens 111 and a second lens 112, but a lens unit may also comprise one lens or three lenses or more lenses which may depend on the function of the lens unit. For example, a lens unit may effect a zoom function, or a focus function, and/or an aperture function or a refracting function or any other optical function reasonable for an optical lens system.

The lens unit 110 may further comprise at least two holes 113, 114 suited for connecting the lens unit 110 to joints in connection with which for instance the lens unit or lens unit means 110 may be made movable as described below.

For instance, any of these holes 113, 114 may extend over the whole length of the lens unit 110, or there may be a third hole placed opposite to hole 113 and there may be a fourth hole placed opposite to hole 114 so that the lens unit 110 may comprise four holes placed in corners of said lens unit.

Figure 1B:
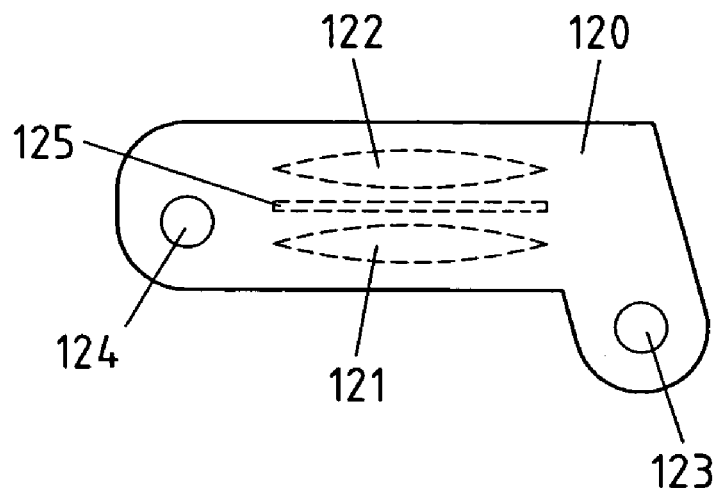

FIG. 1b depicts the side-view of another exemplary lens unit or lens unit means 120 suited to be applied to the present invention which comprises an aperture stop 125 placed between a first lens 121 and a second lens 122. The aperture stop may also be placed on top of the lenses of lens unit 120. Furthermore, the lens unit 120 may comprise a small actuator for opening and closing the aperture stop 125 according to a control signal. Lens unit 120 comprises at least two holes 123, 124, wherein the explanations concerning the holes of the lens unit 110 depicted in FIG. 1a also hold for the lens unit 120 depicted in FIG. 1b.

A first exemplary embodiment of the present invention is depicted on FIGS. 2a-2d.

FIGS. 2a-2d show a device comprising a first movable lens unit 201 and a second movable lens unit 202, wherein further movable lens units may be arranged in the device as explained in the description above. Said lens units may be represented by any of the lens units 110 and 120 depicted in FIGS. 1a and 1b, respectively, and the described variations thereof. For example, the first moveable lens unit 201 may effect a focus function and thus represents a focus element, and the second moveable lens unit 202 may effect a zoom function and thus represents a zoom element. Furthermore, this device may comprise further movable lens units like a third movable lens unit and/or a fourth movable lens unit, which are not depicted in FIGS. 2a-2d, for providing further optical functions like positive and/or negative refracting function or any other optical functions. Thus, in the description of this first exemplary embodiment that follows we will refer to at least two movable lens units 201, 202 in order to indicate that the device may comprise more than the two lens units 201, 202 depicted in FIGS. 2a-2d. Furthermore, an aperture stop may be placed in one of these at least two movable lens units 201, 202.

Figure 2A:
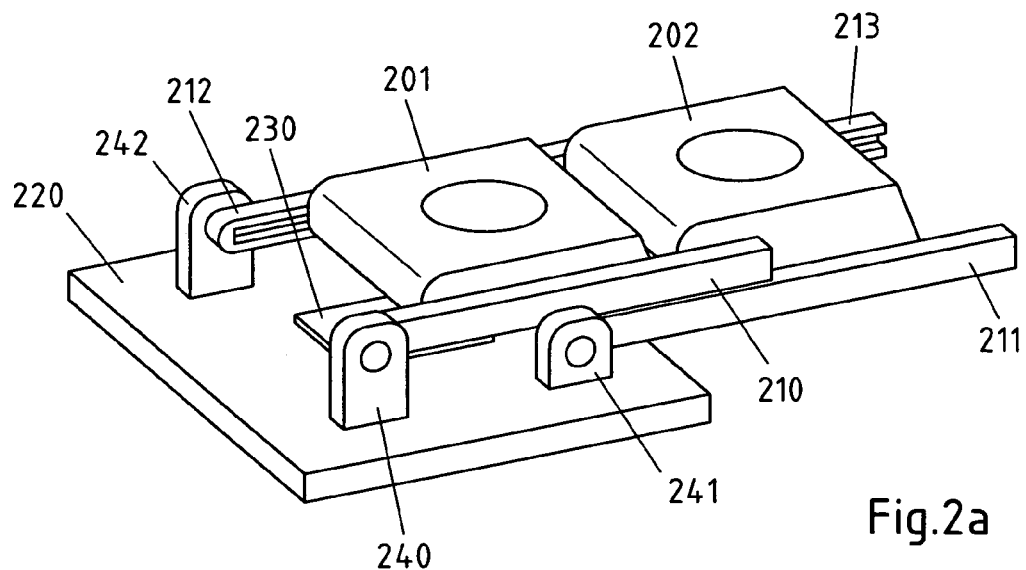
FIGS. 2a-2e: a first exemplary embodiment of the present invention.
Figure 2B:
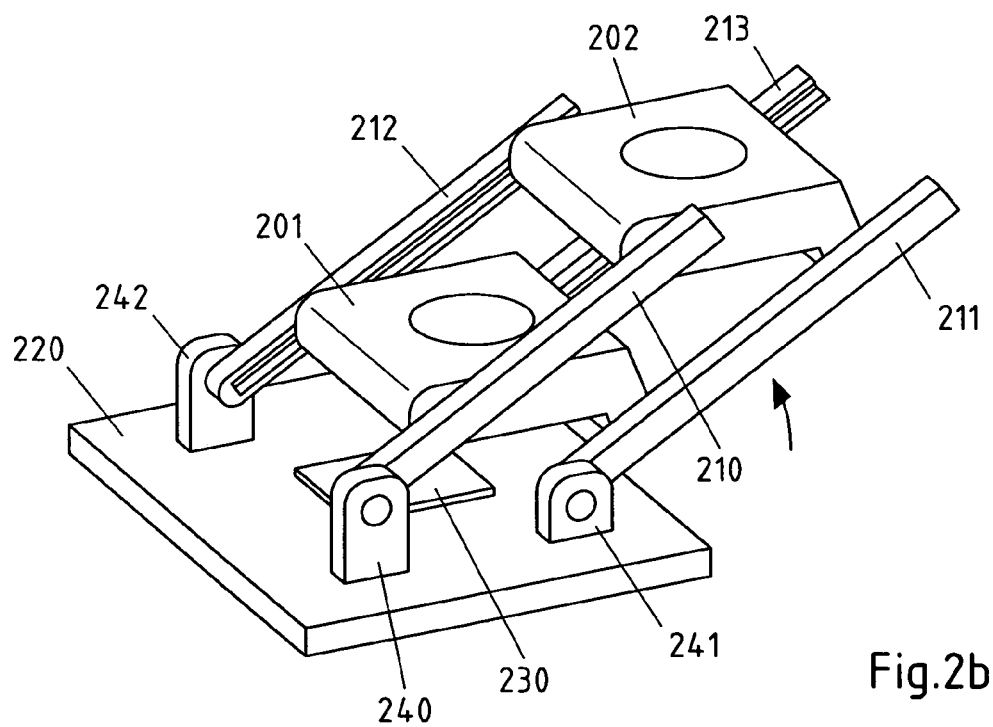
Figure 2C:
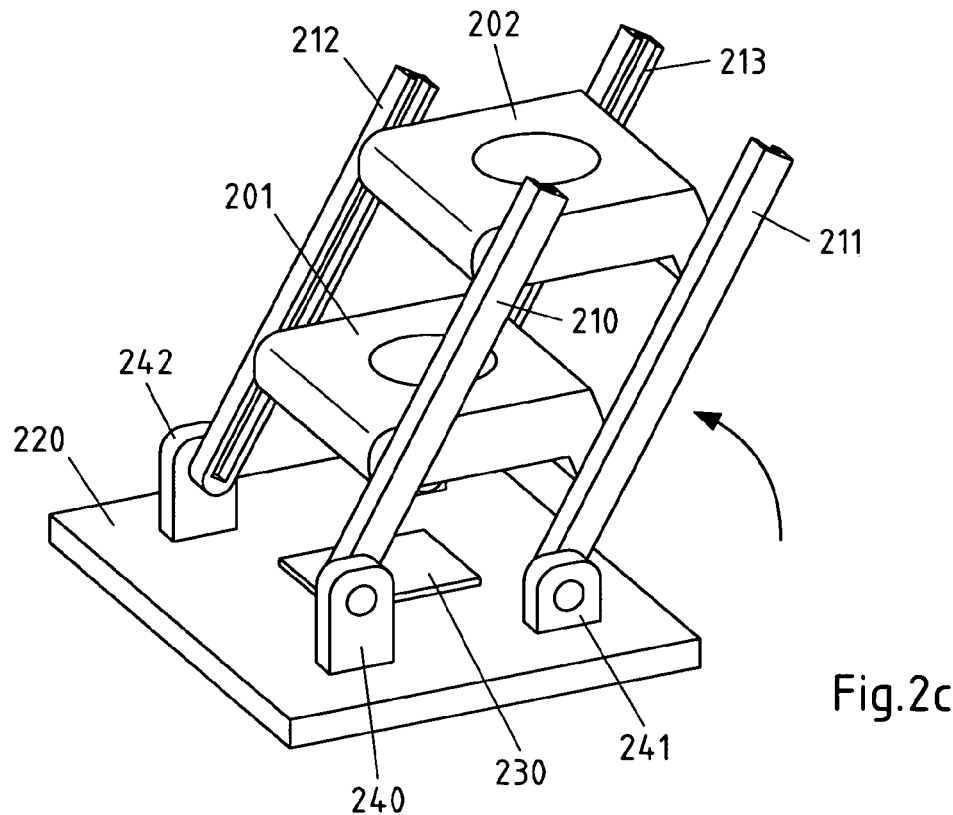

The device is capable of moving the at least two movable lens units 201, 202 into a first state wherein said at least two movable lens units 201, 202 are arranged in parallel to each other, as can be seen in FIG. 2a. This allows placing these two movable lens units in a flat state, and the resultant height of the device is defined by the height of the higher of said two movable lens units when being arranged in the first state.

The device according to the first embodiment further comprises four guide shafts 210, 211, 212, 213, wherein each of said four guide shafts is hinged at a corner area to suspensions 240, 241, 242, 243 of base member 220, so that they can fold around these suspensions 240, 241, 242, 243.

Each of said at least two movable lens units 201, 202 is attached to said four guide shafts 210, 211, 212, 213 by means of joints 250 (not shown in FIGS. 2a-2d). FIG. 2e exemplarily depicts such a connection of the first lens 201 unit to a first guide shaft 212 of said four guide shafts via a joint 250, depicted as detail A in FIG. 2d, wherein this joint 250 enables a rotational movement of the first lens unit and a linear movement in a groove 260 of the first guide shaft 212.

The joint 250 may be inserted in a corresponding hole of the first lens unit 201, for example hole 114 of the lens unit 110 depicted in FIG. 1a or the opposed hole (not shown in FIG. 1a) on the back side of the lens unit 110.

The first movable lens unit 201 may be connected to the remaining three guide shafts 211, 212, 213 in the same way as depicted in FIG. 2e, i.e. by means of joints enabling a rotational and linear movement with respect to the remaining three guide shafts 211, 212, 213. The second movable lens unit 202 may be also connected to the four guide shafts 210, 211, 212, 213 by joints enabling linear and rotational movement.

Figure 2D:
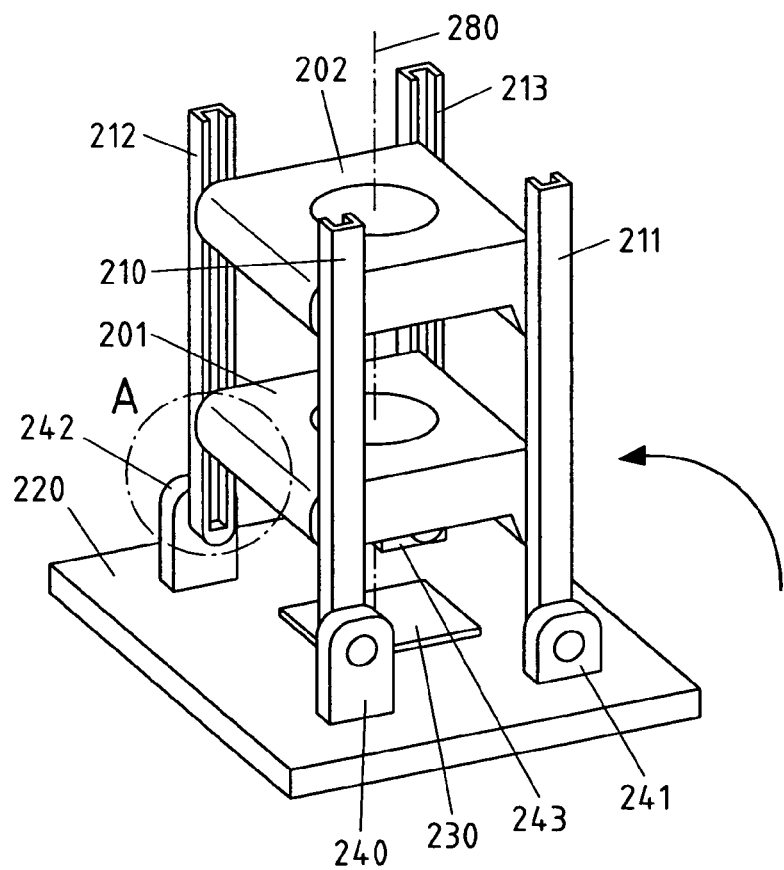
Figure 2E:
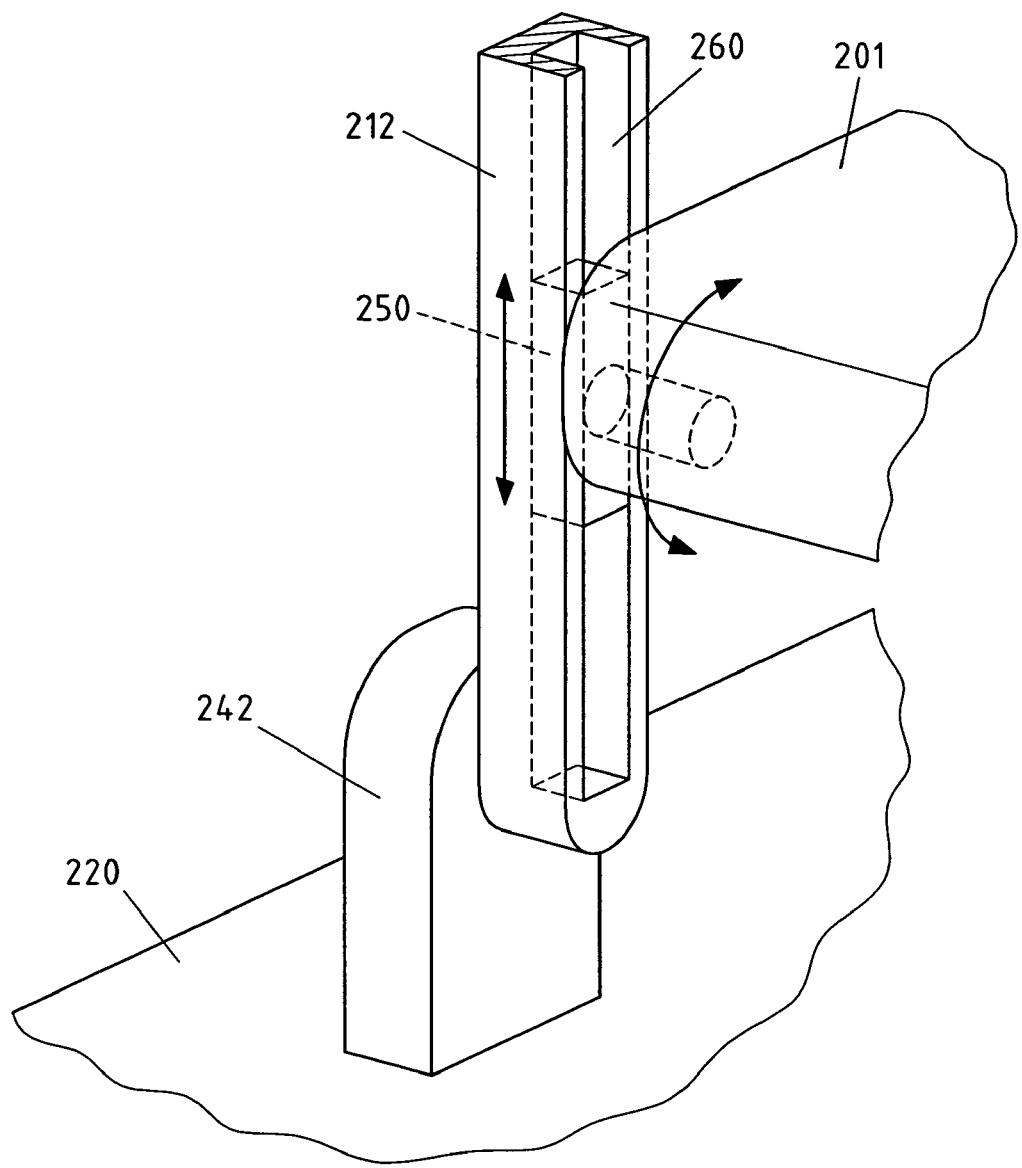

Starting from the first state of the at least two movable lens units 201, 202 depicted in FIG. 2a, the four guide shafts can be rotated around the suspensions 240, 241, 242, 243 and fold ninety degrees with respect to the base member 220, as can be seen from FIGS. 2a-2d, thereby rotating said two movable lens units 201, 202 with respect to the four guide shafts and simultaneously shifting said two movable lens units in grooves 260 of at least two of said four guide shafts 210, 211, 212, 213. Thus, by the rotation of the four guide shafts around the suspensions 240, 241, 242, 243 said two movable lens units can be moved from the first state into a second state wherein said at least two movable lens units are arranged on top of each other and the lenses of said two movable lens units are positioned in an optical axis 280, as depicted in FIG. 2d.

In this second state said optical axis 280 is aligned with the image sensor 230 placed on the base member 260 and thus the device is capable of taking pictures by means of the unfolded at least two movable lens units 201, 202 and the image sensor 230.

Vice versa to the unfolding process described above, starting from the second state of said at least two movable lens units 201, 202 depicted in FIG. 2d, the guide shafts 210, 211, 212, 213 can be rotated backwards around the suspensions 240, 241, 242, 243 so that the at least two movable lens units 201, 202 are automatically moved in the first state.

For example, the joints for connecting at least one of said at least two movable lens units 201, 202 to a couple of adjacent guide shafts 211, 213 may only enable rotational movement, whereas the remaining joints of said one of said at least two movable lens units 201, 202 enable both linear and rotational movement with respect to the first guide shaft 210 and to the second guide shaft 212 being opposed to the couple of adjacent guide shafts 211, 213. For this case, during the unfolding process said one of said at least two movable lens units 201, 202 rotates with respect to the four guide shafts 210, 211, 212, 213 by means of the joints while simultaneously shifting along the guide shafts 210, 212 opposed to the couple of adjacent guide shafts 211, 213. Thus, the position of said one movable lens unit is fixed with respect to said couple of adjacent guide shafts 211, 213, and the distance from said one movable lens unit to the base member is fixed in the second state. Hence, this may be useful for movable lens units which shall be fixed in the second state and not capable of being moved along the optical axis. For example, said at least one movable lens unit being fixed in the second state may be a third movable lens unit (not depicted in FIGS. 2a-2d).

Furthermore, at least one of said at least two movable lens units 201, 202 is connected to the four guiding shafts 210, 211, 212, 213 with joints enabling both linear and rotational movement. Thus, after being unfolded into the second state, said at least one of said at least two movable lens units 201, 202 can be shifted along the guide shafts by means of the linear movement capabilities of the joints so that said at least one of said at least movable lens units 201, 202 is movable along the optical axis. For instance, at least one actuator may be used to perform this movement of said at least one of said at least two movable lens units 201, 202 along the optical axis 280.

Furthermore, the first exemplary embodiment depicted in FIGS. 2a-2d is not delimited to four guide shafts 210, 211, 212, 213. For example, the two adjacent guide shafts 211, 213 may be replaced by a first single guide shaft hinged to suspensions 241, 243 or to a single suspension for enabling a rotation of the first single guide shaft. This first single guide shaft may comprise at least one groove suited for a connection to any of said at least two movable lens units 201, 202 via at least one joint. The same holds for the other two adjacent guide shafts 210, 212, which also may be replaced by a single guide shaft as described above.

According to the first exemplary embodiment of the present invention, the arrangement of said at least two movable lens units 201, 202 in the first state requires only little height so that it may be placed in a small camera thereby achieving a thickness reduction of the small camera. Furthermore, since the maximum height of said arrangement of lens units in the first state does not depend on the sum of the height of said at least two movable lens units 201, 202 but only on the height of the highest of said at least two movable lens units 201, 202, larger optics may be used for lenses of said at least two lens units 201, 202 without increasing the arrangement's height considerably leading to higher optic performance. Furthermore, this allows using a larger image sensor 260 and/or larger pixels or more resolution and may result in high image quality.

When the device shall be used to take pictures said at least two movable lens units 201, 202 can easily be unfolded into the second state and pictures can be taken with high image quality. Afterwards, the device can be folded into the first state.

A device according to the present invention may for example be placed inside or integrated in a mobile phone, PDA or any other electronic handheld device.

Furthermore, the first exemplary embodiment of the present invention may also be used for analog camera devices when the image sensor 230 is replaced with an arrangement suitable to carry an analog film being aligned with the optical axis 280 in the second state of said at least two movable lens units 201, 202.

FIGS. 3a-3f depict sectional views a second exemplary embodiment of the present invention, wherein the device is integrated as a part of a mobile phone 300 having a camera function. This mobile phone 300 may also be a PDA, or any other electronic hand-held device having a camera function.

The mobile phone 300 comprises a housing 361, a display 363, a keypad 364, hardware components 362, a slide cover 360 and a device according to the present invention, wherein said device comprises a first guide shaft 310, a second guide shaft 311, a third guide shaft and a fourth guide shaft (not shown in FIGS. 3a-3e), a first movable lens unit 301, a second movable lens unit 302, a base member 331 with an image sensor 330. Basically, this device corresponds to the device depicted in FIGS. 2a-2d having four guide shafts 210, 211, 212, 213, wherein the two guide shafts 210 and 211 are not depicted in FIGS. 3a-3f because of the sectional view. Thus, the explanations given with respect to the device of the first exemplary embodiment also hold for this second exemplary embodiment.

The first movable lens unit 301 may effect a focus function, and the second movable lens unit 302 may effect a zoom function. Both the first movable lens unit 301 and the second movable lens unit 302 are connected to the guide shafts via joints enabling both linear and rotational movement, in a similar manner as depicted in FIG. 2e with joint 250. The guide shafts may be provided with grooves in order to enable the linear movement of said joints and the connected at two movable lens units 301 and 302, as explained in the first exemplary embodiment. Furthermore, each of said two movable lens units 301, 302 is connected to an actuator/driver unit 350. This actuator/drive unit 350 may comprise at least one actuator. This connection of said two movable lens units 301, 302 to the actuator driver unit 350 and the at least one actuator will be described later with reference to FIG. 4.

FIG. 3a depicts the mobile phone with a disabled camera function, wherein the actuator/driver unit 350 acts as part of the housing and the device is covered by the closed slide cover 360. During this disabled camera function the two movable lens units 301, 302 are arranged parallel to each other according to the first state, resulting in a minimum height of the arranged two movable lens units 301, 302. Thus, the mobile phone 300 is very thin when the camera is disabled.

Before enabling the camera function of the mobile phone 300, the slide cover 360 has to be moved to a left position in order to open the housing, as depicted on FIGS. 3a and 3b. This moving may be performed by a user, or it may be done by a separate actuator which shifts the slide cover to the left position.

Now, as depicted on FIG. 3b, the slide cover 360 is opened and the two movable lens units 301, 302 are still arranged parallel to each other according to the first state.

Then, in order to enable the camera function, the guide shafts 310, 311 are rotated around the suspensions 340, 341 so that said two movable lens units 301, 302 are unfolded, as depicted in FIG. 3c, until said two movable lens units 301, 302 are positioned in the second state wherein the two movable lens units 301, 302 are arranged on top of each other in an optical axis 380, as can be seen from FIG. 3d. This rotation of the guide shafts 310, 311 may be performed by a user, for example by folding the actuator/driver unit manually and thus folding the guide shafts 310, 311, as indicated by the arrow in FIG. 3c, or, alternatively, this rotation may be performed by a separate actuator.

Furthermore, when said two movable lens units 301, 302 reach the second state as depicted in FIG. 3d, the suspensions 340, 341 may automatically lock into place and keep the guide shafts 310, 311 perpendicular to the base member 331.

Vice versa, said two movable lens units 301, 302 can be folded from the second state into the first state.

When said two movable lens units 301, 302 are arranged in the second state as depicted in FIG. 3d, then the camera function of the mobile phone 300 is enabled.

In this second state, the first movable lens unit 301 and the second movable lens unit 302 can be shifted up and down along the optical axis 380 separately by means of the actuator/driver unit 350, so that the first movable lens unit 301 may be shifted up and down in order to focus the pictures, e.g. by a manual focus function or an autofocus function, and so that the second movable lens unit 302 may be shifted up or down in order to zoom in or out.

Furthermore, the actuator/driver unit is capable of moving said two movable lens units 301, 302 to a suitable place before the guiding shafts start to fold down said two movable lens units 301, 302 into the first state.

This suitable place in the second state allows folding said two movable lens units 301, 302 in parallel position next and close to each other in the first state as depicted in FIG. 3a. This results in a minimized thickness and minimized width of the arrangement comprising said two movable lens units 301, 302.

The actuator/driver unit 350 is fixed to guide shaft 311 and to the adjacent guide shaft (not depicted in FIGS. 3a-3f), and the first movable lens unit 301 and the second movable lens units 302 are each connected separately to a corresponding actuator of said actuator/driver unit 350 via an actuator interface.

Figure 4:
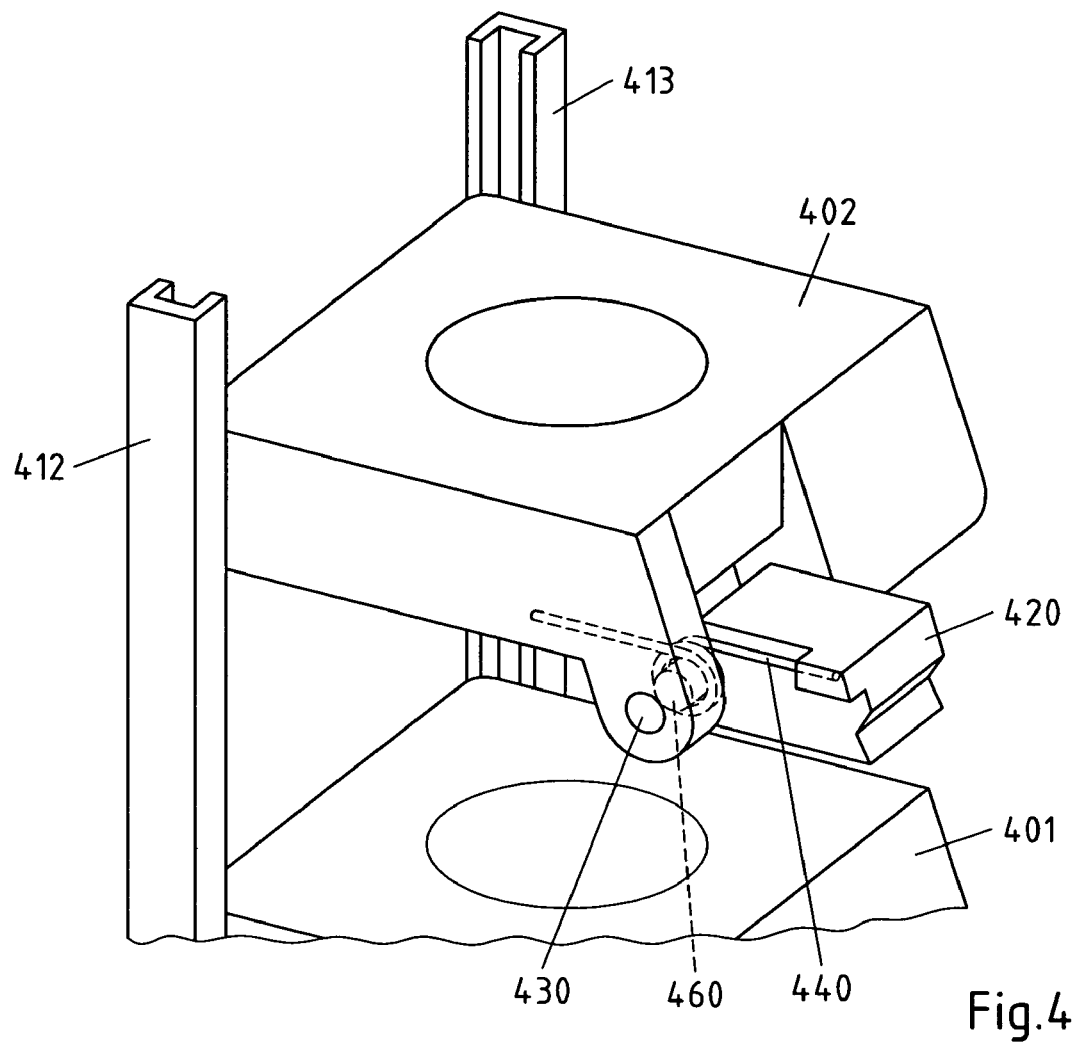
FIG. 4: a first exemplary planar orientation mechanism of the present invention.

This connection of a movable lens unit 402 via an actuator interface 420 is depicted in FIG. 4, which shows a partial view of a device according to present invention wherein the two guide shaft adjacent to the guide shafts 412 and 413 are not shown. The connection depicted in FIG. 4 may be applied to any of the above-mentioned lens units 201, 202, 301, 302 in order to connect to an actuator.

The actuator interface 420 is connected to the movable lens unit 402 in such a way that the movable lens unit 402 can rotate with respect to the actuator interface 420 when the guide shafts rotates between the first state and the second state. This is achieved with a first pin 460 attached to the left side actuator interface 420 inserted in the hole 430 of the lens unit 402. Furthermore, not shown in FIG. 4, the actuator interface may comprise a second pin on the right side inserted in a corresponding hole of the lens unit 402. Thus, by means of this rotatable connection the actuator interface 420 is capable of moving the lens unit 402 up or down, and it is does not affect the folding and unfolding process.

Alternatively, the pin of a joint inserted in hole 430, e.g. see joint 250 in FIG. 2e, may be extended so that this extended pin is inserted through hole 430 and into a corresponding hole inside the actuator interface. The same may be applied to the right side of the actuator interface. This rotational connection is not delimited to the use of a pin, also other flexible connections may be applied.

Furthermore, a spring 440 is mounted on the actuator interface and the end of the spring 440 is mounted to the lens unit 402. For instance, this spring 440 may be a small coil.

As can be seen from FIG. 4, this spring 440 is arranged in such a way that it applies no force to the lens unit 402 when the position of the lens unit 402 is at ninety degrees with respect to the guide shafts 412, 413, but in case of a misalignment of this lens unit with respect to the guide shafts 412, 413, i.e. an angle deviating from ninety degrees to the guide shafts 412, 413, the spring 440 automatically applies a force in an direction opposite to this misalignment. Thus, this spring 440 is capable of controlling the alignment of the optical axis of the lens unit 402 with respect to the image sensor 230, 330 when in the second state. Furthermore, this alignment control also enables keeping of the corresponding lens unit 402 in a planar state during a movement sequence of said lens unit 402.

Furthermore, the actuator interface 420 may fix the position of the lens unit 402 with respect to the guide shafts during the folding and unfolding process, so that the lens unit 402 is shifted in the grooves of the opposite guide shafts 412 and 413 during the folding or unfolding process.

Figure 5A:
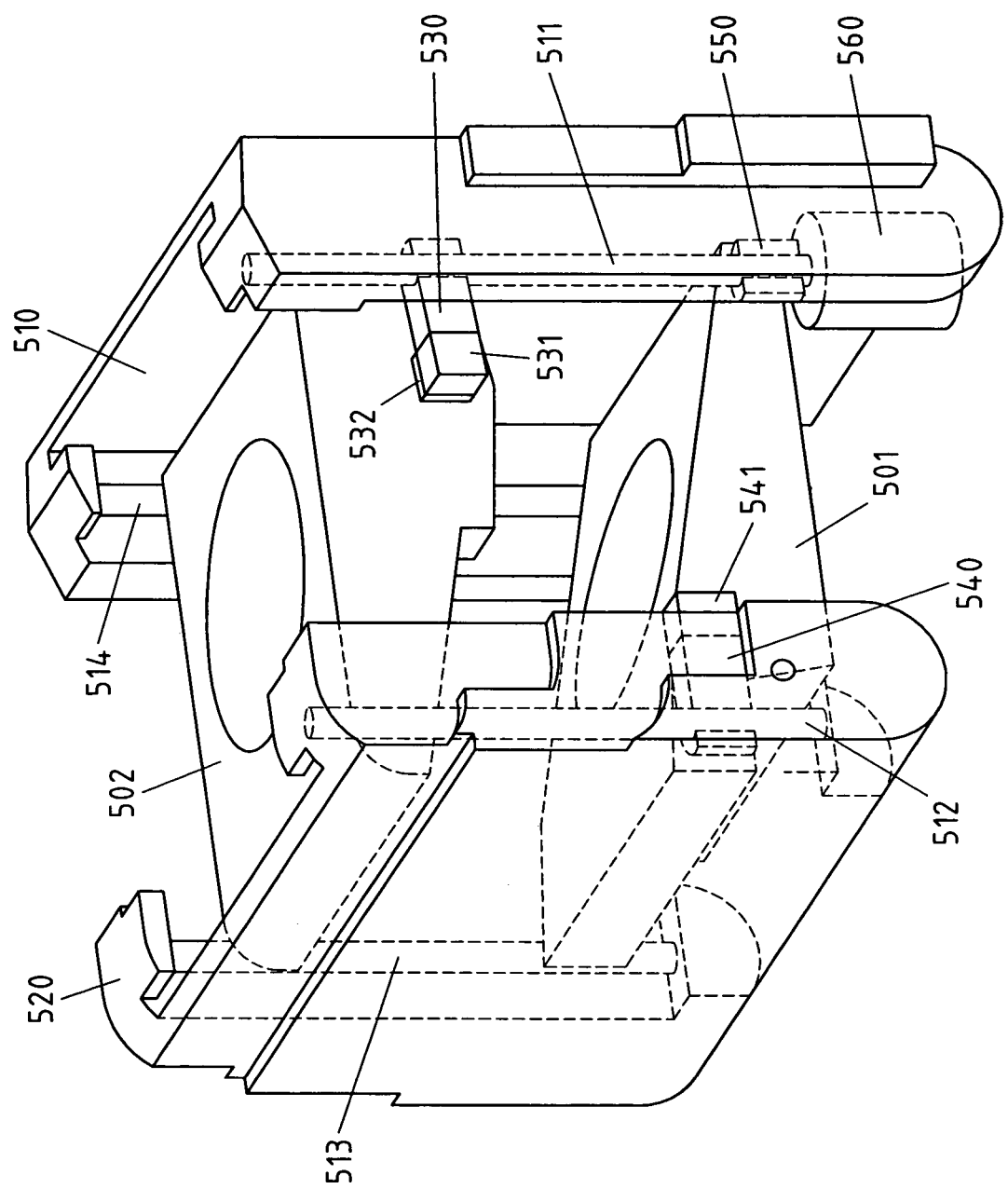
FIGS. 5a-5b: a third exemplary embodiment of the present invention including a second exemplary planar orientation mechanism.
Figure 5B:
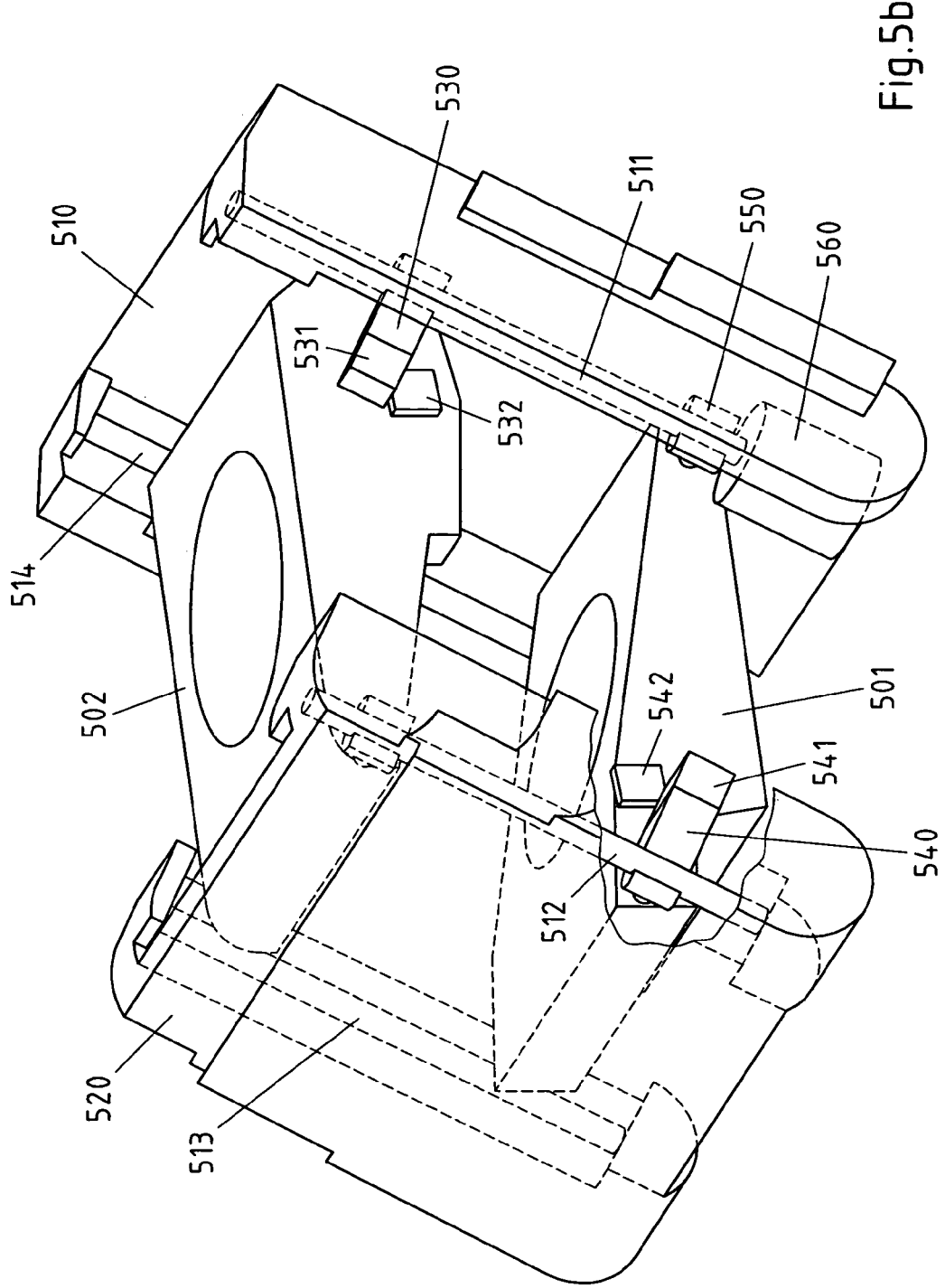

FIGS. 5a and 5b depict a third exemplary embodiment of the present invention including a second exemplary planar orientation mechanism for the movable lens units. This second exemplary planar orientation mechanism may also be combined with any of the exemplary embodiments mentioned above.

Compared to the first exemplary embodiment, the joints 550 of said at least two movable lens units 501, 502 enable linear movement directly on the bar-shaped guide shafts 511, 512, 513, 514, as can be seen from FIG. 5b.

Furthermore, a first actuator 560 is fixed to a first guide shaft 511, wherein the first actuator 560 enables linear movement of a first lens unit 501 by use of a lead screw in order to shift the joint 550 and the corresponding first lens unit 501. The first actuator 560 may comprise at least one stepper motor, for example two stepper motors may be used.

A second actuator (not shown in FIGS. 5a and 5b) may be fixed to a second guide shaft 514 in order to enable linear movement of a second lens unit 502 in the same way as mentioned above concerning the first lens unit 501.

The first guide shaft 511 and the second guide shaft 514 may be covered with a first case 510, and the remaining two guide shafts 512, 513 may be covered with a second case 520.

The second lens unit 502 comprises a first small magnet 532 arranged on a sidewall of the lens unit 502, and a second small magnet 531 is mounted on a carrier 530 which is movable on the first guide shaft 511, wherein the second small magnet 531 is fixed at one end of carrier 530, and said carrier 530 comprises a joint on the other end of the carrier 530 for mounting the carrier 530 and the second small magnet 531 movably on said first guide shaft 511.

As can be seen from FIG. 5a, which depicts the unfolded arrangement of the two lens units 501, 502 according to the second state, the second small magnet 531 overlaps the first small magnet 532 in the unfolded position according to the second state, and thus both small magnets 531, 532 are fixed magnetically. Since the second magnet 531 can follow a movement of the corresponding lens unit 502 along the optical axis, this magnetic fixing via the pair of two magnets 531, 532 keeps the lens unit 502 at a ninety degree angle with respect to the guide shaft and keeps the lens unit 502 straight even during a linear movement along the optical axis, wherein twisting and/or wobbling is prevented.

The first lens unit 501 also comprises a first small magnet 542 and a corresponding second small magnet 541 attached to another carrier 540 enabling linear movement on guide shaft 512. The explanations for the magnetic fixing of the second lens unit 502 also hold for the first lens unit 501.

When said at least two movable lens units are folded from the second state into the first state, the magnetic fixing between a first magnet 532, 542 and a second magnet 531, 541 is disconnected, as depicted in FIG. 5b, and, vice versa, when folding into to second state the second magnet 531, 541 automatically fixes the corresponding first magnet 532, 542, as depicted in FIG. 5a.

The use of said first magnets 532, 542 and said second magnets 531, 541 to keep the corresponding lens unit 501, 502 straight during their vertical movements in the second state shows the advantage that magnets are reliable and thus not tolerance-sensitive, and that magnets are permanent and do not wear.

Figure 6A:
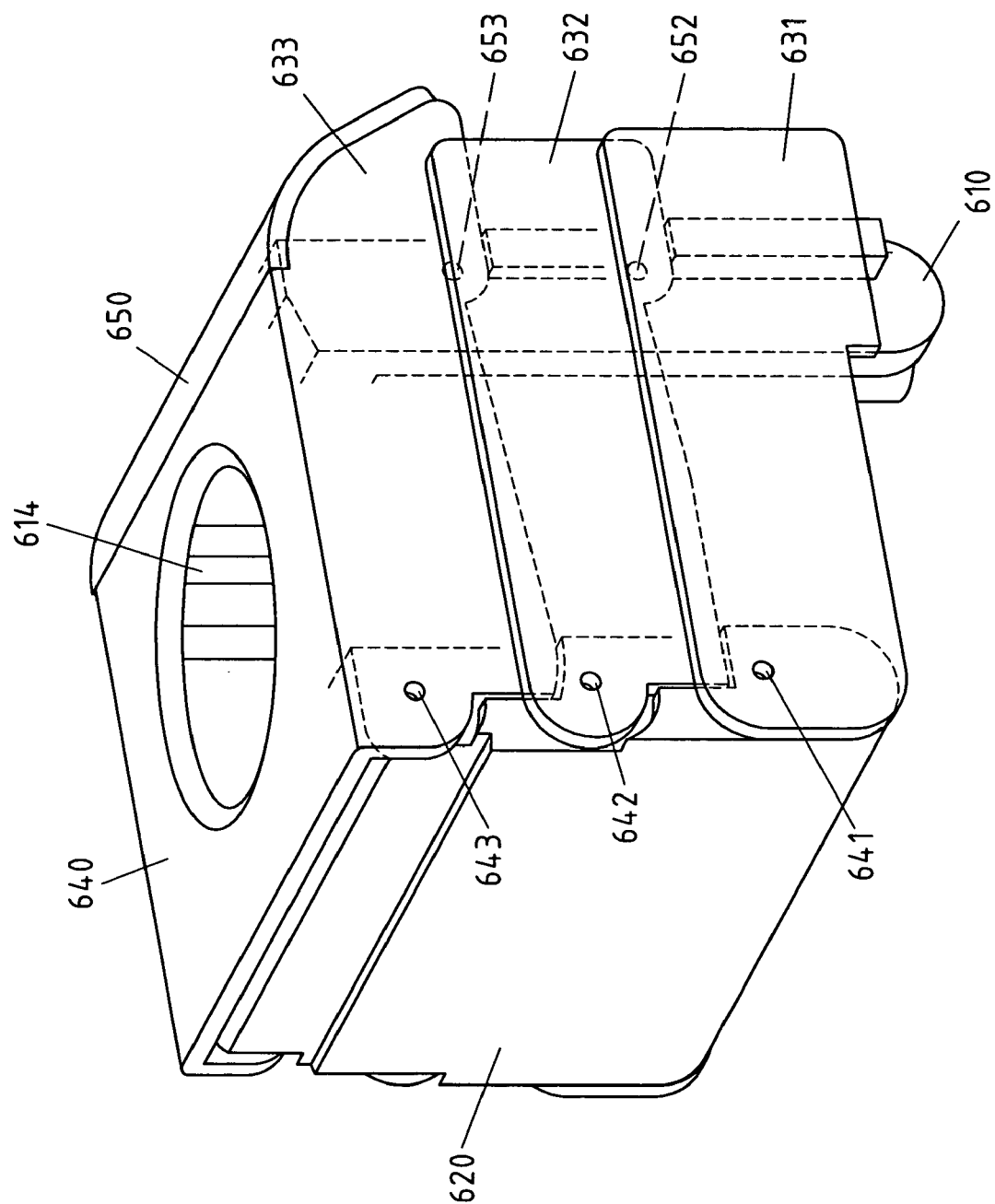
FIGS. 6a-6c: an exemplary foldable sidewall according to the present invention.
Figure 6B:
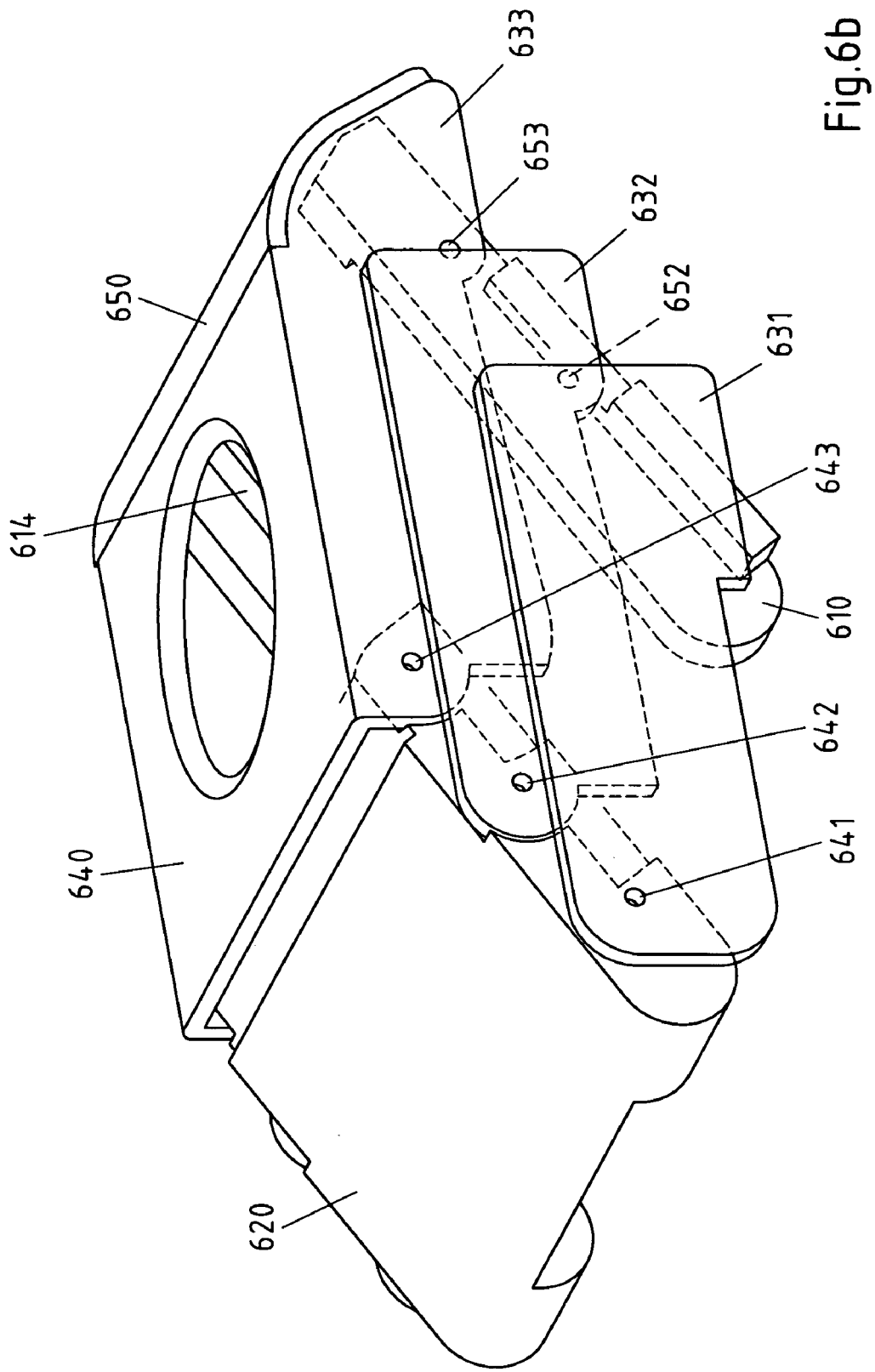
Figure 6C:
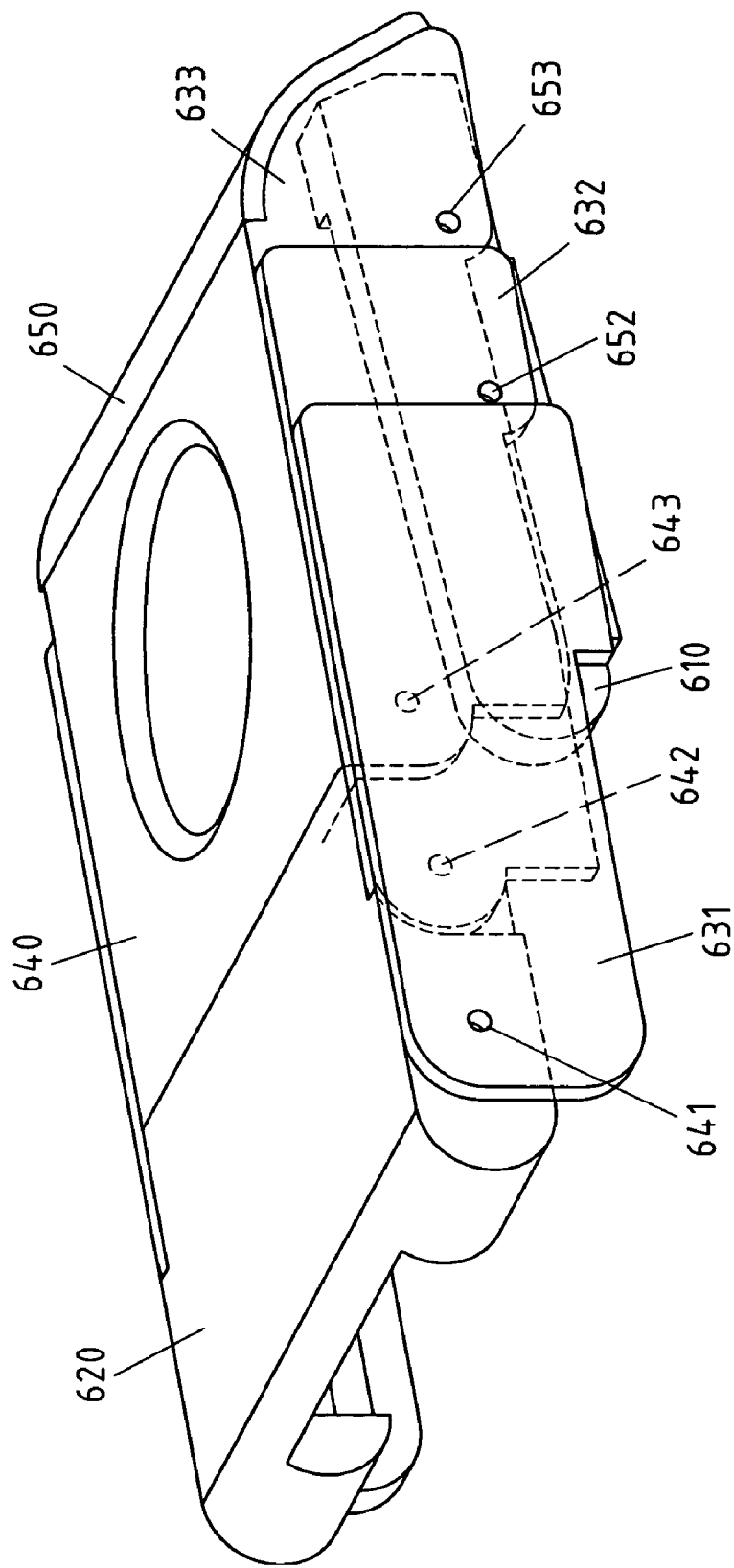

FIGS. 6a-6c depict an exemplary foldable sidewall 631, 632, 633 according to the present invention which may be applied to any of the previous mentioned exemplary embodiments of the invention, wherein the FIGS. 6a-6c only depicts a simplified view without showing the at least two movable lens units and depicting only one guide shaft 614 of the at least two guide shafts.

For example, the first case 610 depicted in FIGS. 6a-6c may correspond to the first case 510 depicted in FIGS. 5a-5b and may be fixed to two guide shafts 511, 514 of the third embodiment, and the second case 620 depicted in FIGS. 6a-6c may correspond to the second case 520 depicted in FIGS. 5a-5b and may be fixed to two guide shafts 512, 513 of the third embodiment. In the following, it is assumed that the four guide shafts 511, 512, 513, 514 of the third exemplary embodiment depicted in FIGS. 5a-5b are placed in the device depicted in FIGS. 6a-6c and fixed to the first case 610 and to the second case 620 as mentioned above.

As can be seen from FIGS. 6a-6c, the first case 610 and the second case 620 are foldable thereby following the folding process of the guide shafts and following the shape deformation of the side surface between two adjacent guide shafts 511, 512.

The foldable sidewall 631, 632, 633 comprises three overlapping wings 631, 632, 633, wherein each of said overlapping wings 631, 632, 633 is connected rotatably to the second case 620 by means of holes 641, 642, 643 and joints (not shown in FIGS. 6a-6c), and wherein each of said overlapping wings 631, 632, 633 is connected rotatably to the first case 610 by means of holes 652, 653 and joints (not shown in FIGS. 6a-6c).

Thus, said three overlapping wings 631, 632, 633 form a foldable sidewall 631, 632, 633 capable of following a shape deformation of said side surface between said two adjacent guide shafts 511, 512 during the folding and unfolding process, as depicted in FIGS. 6a-6c. Simultaneously, said foldable sidewall 631, 632, 633 also follows the shape deformation of the front side surface between the first case 610 and the second case 620.

The foldable sidewall 631, 632, 633 may also be placed on the rear side of the first case 610 and the second case 620 in order to provide a foldable sidewall to enable following the shape deformation of the side-surface between the other two adjacent guide shafts 513, 514 and the corresponding rear side-surface between the first case 610 and the second case 620.

Thus, in the first state and in the second state and during the folding and unfolding process dust protection is ensured by means of the foldable sidewall 631, 632, 633.

In order to ensure dust protection on the top of the arrangement comprising the four guide shafts 511, 512, 513, 514, the first case 610 and the second case 620, and both foldable sidewalls on the front foldable sidewall 631, 632, 633 and the rear foldable sidewall, a cover 640 including a hole for the lenses is placed on top of said arrangement. This cover 640 may be fixed to the highest 633 of the overlapping wings of the front foldable sidewall 631, 632, 633 and to the highest of the overlapping wings of the rear foldable sidewall. The cover 650 may ensure further dust protection.

The invention has been described above by means of exemplary embodiments. It should be noted that there are alternative ways and variations which will be evident to any person skilled in the art and can be implemented without deviating from the scope and spirit of the appended claims. In particular, the exemplary embodiments may comprise more than two movable lens units, the joint design between the lens units and guide shafts may be arranged in a different way as described above, and the planar orientation mechanism depicted in FIGS. 4 and 5a, 5b could be arranged differently.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

The invention claimed is:

1. An apparatus, comprising:
at least two movable lens units, wherein each of said at least two movable lens units comprises at least two lenses,
wherein said at least two movable lens units are movable into a first state wherein said at least two movable lens units are arranged in parallel to each other,
wherein said at least two movable lens units are movable into a second state wherein said at least two movable lens units are arranged on top of each other for positioning each of the at least two lenses of said at least two movable lens units in a common optical axis, wherein the common optical axis extends in one direction,
wherein said apparatus further comprises a lever mechanism to move said at least two movable lens units into the first or into the second state, and wherein said lever mechanism is connectable to a base member,
wherein the lever mechanism comprises at least two guide shafts, wherein each of said at least two guide shafts is hinged to the base member, and wherein each of said at least two movable lens units is connected to said at least two guide shafts via a set of joints, and
wherein each of the joints of said set of joints has a degree of freedom for enabling rotational movement, and wherein at least one of the joints of said set of joints has a second degree of freedom for enabling linear movement, so that said lever mechanism is capable of unfolding said at least two movable lens units from the first state into the second state and capable of folding said at least two movable lens units from the second state into the first state.

2. The apparatus according to claim 1, wherein a first lens unit of said at least two movable lens units represents a lens unit for effecting a focus function.

3. The apparatus according to claim 2, wherein the focus function is an autofocus function.

4. The apparatus according to claim 1, wherein a first lens unit of said at least two movable lens units represents a lens unit for effecting a zoom function.

5. The apparatus according to claim 1, wherein a first lens unit of said at least two movable lens units represents a lens unit for effecting a focus function, and wherein a second lens unit of said at least two movable lens units represents a lens unit for effecting a zoom function.

6. The apparatus according to claim 1, wherein in the second state at least one of said at least two movable lens units is movable along the optical axis.

7. The apparatus according to claim 1, wherein each joint of at least one of said set of joints has two degrees of freedom for enabling rotational and linear movement, and wherein in the second state the at least one of said two movable lens units associated with said at least one of said set of joints units is movable along the optical axis.

8. The apparatus according to claim 7, wherein the apparatus comprises at least one actuator for moving said at least one of said at least two movable lens units along the optical axis when said at least two movable lens units are arranged in the second state.

9. The apparatus according to claim 8, wherein said at least one actuator is fixed to the lever mechanism, and wherein each of said at least one of said at least two movable lens units is connected to one of said at least one actuator via an actuator interface.

10. The apparatus according to claim 9, wherein said at least one actuator is suited to align said at least one of said at least two movable lens units so that the at least two lenses of said at least one of said at least two movable lens units are arranged in the common optical axis in the second state.

11. The apparatus according to claim 10, a spring connects the actuator interface and the corresponding lens unit to keep the corresponding lens unit at a ninety degree angle with respect to the guide shafts in the second state.

12. The apparatus according to claim 8, wherein a first small magnet is arranged on a sidewall of a first of said at least one of said at least two movable lens units, and wherein a second small magnet is mounted movably on one of said at least two guide shafts, so that in the second state said first small magnet fixes magnetically to the second small magnet and is capable of keeping the corresponding lens unit at a ninety degree angle with respect to the guide shafts in the second state.

13. The apparatus according to claim 8, wherein said at least one actuator is capable of moving said at least one of said at least two movable lens units to a suitable place before the guiding shafts start to fold down said at least two movable lens units into the first state.

14. The apparatus according to claim 1, wherein at least one side surface between two adjacent guide shafts is covered with at least two overlapping wings, wherein said at least two overlapping wings form a foldable sidewall capable of following a shape deformation of said side surface between said two adjacent guide shafts.

15. The apparatus according to claim 1, wherein the base member comprises an optical sensor, and wherein said optical sensor is aligned with the common optical axis of the at least two lenses of said of at least two movable lens units in the second state.

16. The apparatus according to claim 1, wherein the apparatus is a digital camera.

17. Mobile phone comprising the apparatus according to claim 1.

18. Apparatus comprising:
a first movable lens unit means and a second movable lens unit means, wherein said first movable lens unit means and said second movable lens unit means comprises at least two lenses,
wherein said first movable lens unit means and said second movable lens unit means are for moving into a first state arranged in parallel and for moving into a second state arranged on top of each other for positioning lenses of said at least the first movable lens unit means and the second movable lens unit means in a common optical axis, wherein the common optical axis extends in one direction,
wherein said apparatus further comprises a lever mechanism means to move said at least two movable lens unit means into the first or into the second state, and wherein said lever mechanism means is connectable to a base member,
wherein the lever mechanism means comprises at least two guide shaft means, wherein each of said at least two guide shaft means is hinged to the base member, and wherein each of said at least two movable lens unit means is connected to said at least two guide shaft means via a set of joint means, and
wherein each of the joint means of said set of joint means has a degree of freedom for enabling rotational movement, and wherein at least one of the joint means of said set of joint means has a second degree of freedom for enabling linear movement, so that said lever mechanism means is capable of unfolding said at least two movable lens unit means from the first state into the second state and capable of folding said at least two movable lens unit means from the second state into the first state.

19. The apparatus according to claim 1, wherein one of said at least two movable lens units comprises an aperture stop.

\* \* \* \* \*